(12) United States Patent
Kobayashi

(10) Patent No.: US 11,393,498 B2
(45) Date of Patent: Jul. 19, 2022

(54) HEAD ASSEMBLY WITH SUSPENSION SYSTEM FOR A TAPE EMBEDDED DRIVE

(71) Applicant: Western Digital Technologies, Inc., San Jose, CA (US)

(72) Inventor: Masahito Kobayashi, Ushiko (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/240,691

(22) Filed: Apr. 26, 2021

(65) Prior Publication Data

US 2021/0249042 A1    Aug. 12, 2021

Related U.S. Application Data

(62) Division of application No. 16/365,034, filed on Mar. 26, 2019, now Pat. No. 10,991,390.

(60) Provisional application No. 62/803,366, filed on Feb. 8, 2019, provisional application No. 62/816,860, filed on Mar. 11, 2019.

(51) Int. Cl.
| | |
|---|---|
| *G11B 5/584* | (2006.01) |
| *G11B 5/48* | (2006.01) |
| *G11B 5/55* | (2006.01) |
| *G11B 5/008* | (2006.01) |
| *G11B 23/087* | (2006.01) |
| *G11B 25/06* | (2006.01) |
| *G11B 33/14* | (2006.01) |
| *G11B 21/02* | (2006.01) |
| *G06F 13/42* | (2006.01) |

(52) U.S. Cl.
CPC .......... *G11B 5/584* (2013.01); *G11B 5/00817* (2013.01); *G11B 5/4893* (2013.01); *G11B 5/5504* (2013.01); *G11B 21/027* (2013.01); *G11B 23/087* (2013.01); *G11B 25/063* (2013.01); *G11B 33/14* (2013.01); *G06F 13/4282* (2013.01); *G06F 2213/0028* (2013.01)

(58) Field of Classification Search
None
See application file for complete search history.

(56) References Cited

U.S. PATENT DOCUMENTS

| | | | |
|---|---|---|---|
| 5,191,492 A | 3/1993 | Nayak et al. | |
| 5,982,592 A * | 11/1999 | Saito et al. | G11B 15/62 360/130.31 |

(Continued)

FOREIGN PATENT DOCUMENTS

| | | |
|---|---|---|
| JP | 5897129 A | 6/1983 |
| JP | H1079153 A | 3/1998 |

(Continued)

*Primary Examiner* — Craig A. Renner
(74) *Attorney, Agent, or Firm* — Chang & Hale LLP

(57) ABSTRACT

A storage device comprises tape reel(s) holding tape media for storing data, a head assembly, motor(s) configured to actuate the head assembly, a sealed casing, and a printed circuit board assembly (PCBA) configured to control operations of the motor(s). The head assembly comprises a support structure, a head bar with read head(s) and write head(s), and a suspension system connecting the head bar to the support structure. The sealed casing encloses in its interior the tape reel(s), the head assembly, and the motor(s). Meanwhile, the PCBA is mounted on an external surface of the casing.

20 Claims, 12 Drawing Sheets

(56) References Cited

U.S. PATENT DOCUMENTS

| | | | |
|---|---|---|---|
| 7,054,101 B1 * | 5/2006 | Marion et al. | G11B 5/584 |
| | | | 360/90 |
| 2008/0266705 A1 | 10/2008 | Saliba et al. | |
| 2009/0067097 A1 | 3/2009 | Biskeborn et al. | |
| 2009/0201603 A1 * | 8/2009 | Bui et al. | G11B 5/584 |
| | | | 360/77.12 |

FOREIGN PATENT DOCUMENTS

| JP | H10241232 A | 9/1998 |
|---|---|---|
| JP | 2002514338 A | 5/2002 |
| JP | 2005346793 A | 12/2002 |
| JP | 2016508657 A | 3/2016 |
| JP | 2016524774 A | 8/2016 |

\* cited by examiner

HEAD ASSEMBLY WITH SUSPENSION SYSTEM FOR A TAPE EMBEDDED DRIVE

CROSS-REFERENCE TO RELATED APPLICATIONS

The present application is a divisional of U.S. patent application Ser. No. 16/365,034, filed on Mar. 26, 2019, issuing as U.S. Pat. No. 10,991,390, entitled HEAD ASSEMBLY WITH SUSPENSION SYSTEM FOR A TAPE EMBEDDED DRIVE, which claims priority to U.S. Provisional Patent Application Ser. No. 62/803,366, filed Feb. 8, 2019, entitled TAPE EMBEDDED DRIVE, and U.S. Provisional Patent Application Ser. No. 62/816,860, filed Mar. 11, 2019, entitled TAPE EMBEDDED DRIVE, the disclosures of which are hereby incorporated by reference in their entireties.

BACKGROUND

Field

This disclosure relates to tape-based data storage devices. More particularly, the disclosure relates to a data storage device with an embedded tape-based reading and writing mechanism.

Description of Related Art

In certain computing systems, tape storage systems comprise of a tape drive and tape cartridges or cassettes that store tape media (also called tape film or magnetic tape). The tape drive performs writing or reading of data in the cartridges or cassettes.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1A:
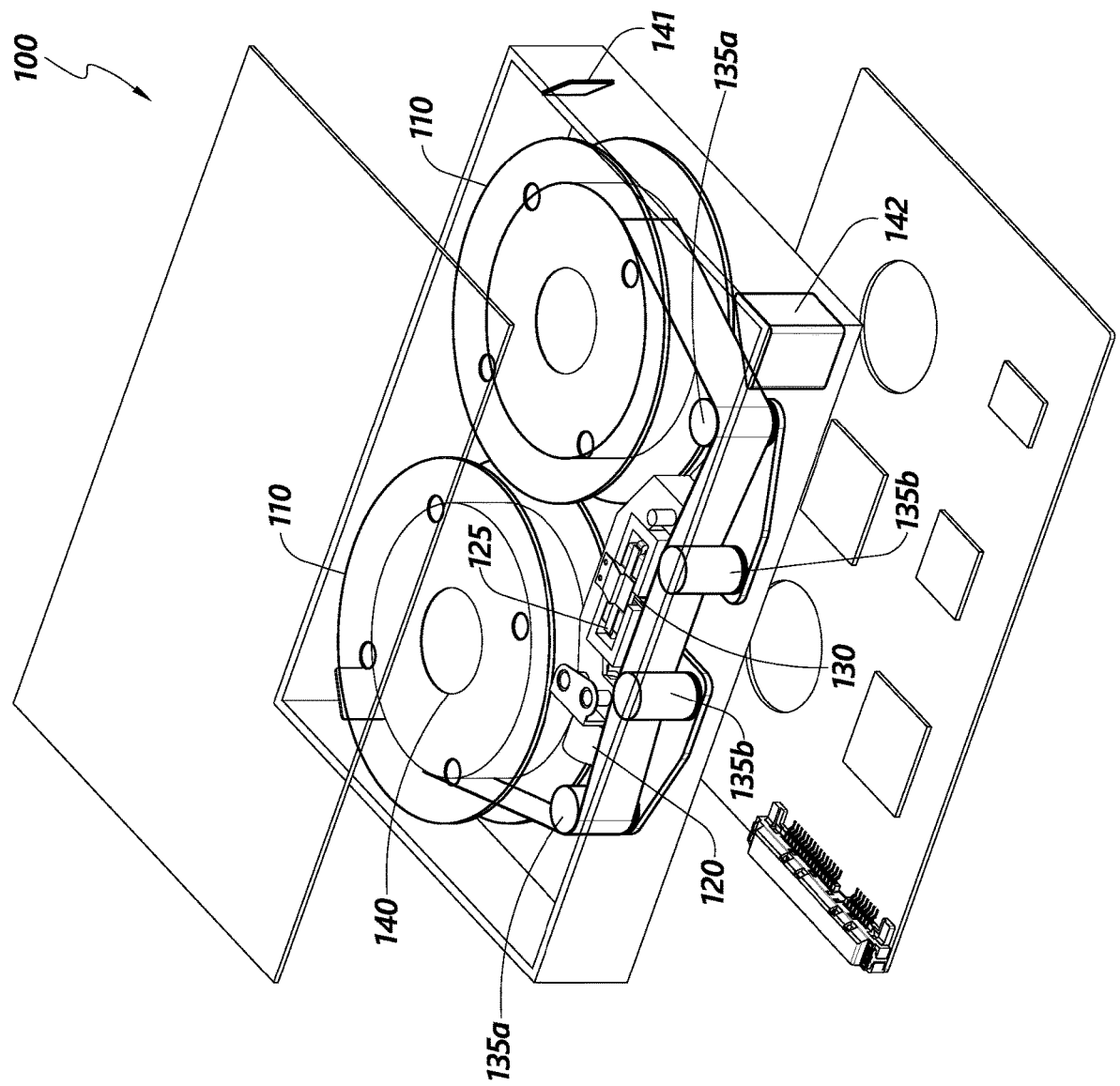
FIGS. 1A-1C illustrate a perspective exploded view and a simplified top down and side profile view of a tape embedded drive, in accordance with some embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Although the principles disclosed herein may be applicable to any suitable or practical data storage system or environment, for convenience, certain embodiments are disclosed herein in the context of tape-based data storage systems.

Tape data storage is a system for storing digital information on magnetic tape using digital recording. Tape storage media is most commonly packaged in cartridges and cassettes. A tape drive performs writing or reading of data in the cartridges or cassettes. Autoloaders and tape libraries can be used to automate cartridge handling by moving cartridges/cassettes from a library of cartridges to the tape drive and vice versa. A common cassette-based format is LTO, which comes in a variety of densities.

In the context of magnetic tape, the term cassette usually refers to an enclosure that holds two reels with a single span of magnetic tape. The term cartridge is more generic, but frequently means a single reel of tape in a plastic enclosure. For convenience, the disclosure will refer to cassettes, but the described technology can also be applied to cartridges.

The type of packaging is a large determinant of the load and unload times as well as the length of tape that can be held. A tape drive that uses a single reel cartridge has a take-up reel in the drive while cassettes have the take-up reel in the cassette. A tape drive (or "transport" or "deck") uses precisely controlled motors to wind the tape from one reel to the other, passing a read/write head as it does.

Current tape drive library systems have several deficiencies. As tapes are open to the environment, the tape storage facility (e.g., data center) needs to control the humidity and temperature to ensure the reliability of the tape. Such environmental maintenance can be expensive. In addition, even with such maintenance, long-term reliability can still be a problem. For example, variances in temperature or contamination from dust could affect the reliability of the tape drives.

In addition, the robotics used to move a tape cassette from a tape holder in the library to the tape drive system can cause additional delay in reading. For example, access time for both robotics (about average 50 s) and tape drive (about average 50 s) can be about 100 s.

Furthermore, the tape drive system uses an up/down stepping motor and voice coil motor (VCM), called dual stage motors, to move a large writer and reader head bar. At higher tracks per inch (TPI), the large head bar limits the accuracy possible with the dual stage motors. Additionally, the tape drive system needs to support multiple generations of cassettes. The tape drive system may need to write and read data for several types of tape film vendors and recording generations. Maintaining compatibility can limit the possibility of technology improvement.

Tape Embedded Drive Overview

One possible solution to these problems is a tape embedded drive, embodiments of which are discussed below. The tape embedded drive is, in some embodiments, a cassette that integrates the tape media and the head(s) for reading and writing. Further, the cassette can utilize, for example, the 3.5 inch form factor common to hard disk drives (HDD). By using the 3.5 inch form factor, technologies developed for HDDs such as controllers and sealed drive technology can be adapted or otherwise utilized for tape drives. For example, a similar PCBA used in HDD drives could be used, providing a SATA or a SAS interface to the host. Further, the PCBA can comprise a system-on-a-chip (SoC) and/or other control circuitry, including, for example, data read channel, memory, motor driver(s) and actuator driver(s). Integrating the head technology can eliminate the need for maintaining a tape library system, including the associated maintenance costs.

In addition, using a standardized form factor such as the 3.5 inch form factor can provide better integration with existing data center infrastructure. HDDs are commonly used in data centers for storage, with specialized racks and servers designed to utilize 3.5 inch form factor HDDs. By using the 3.5 inch form factor, the tape embedded drive can simplify the maintenance and infrastructure needs of data centers. Rather than having a second set of infrastructure for supporting tape drives, the data center could utilize the same infrastructure to support both HDDs and tape embedded drives such as those described in this disclosure. In certain other embodiments, the same integrated approach can be applied to a non-3.5 inch form factor construction. For example, a 2.5 inch or 5.25 inch form factor may be used, or another generally rectangular form factor may be used. Using a 2.5 inch or 5.25 inch form factor may also provide the same infrastructure and other benefits mentioned above with respect to the 3.5 inch form factor.

Figure 1B:
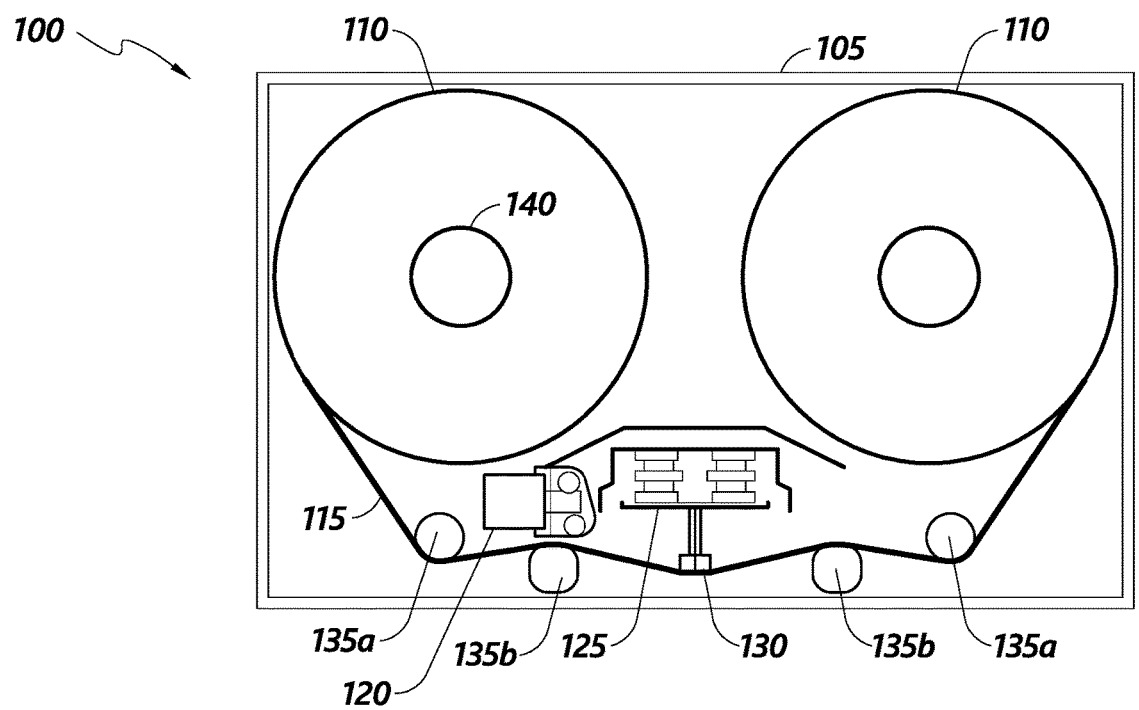
Figure 1C:
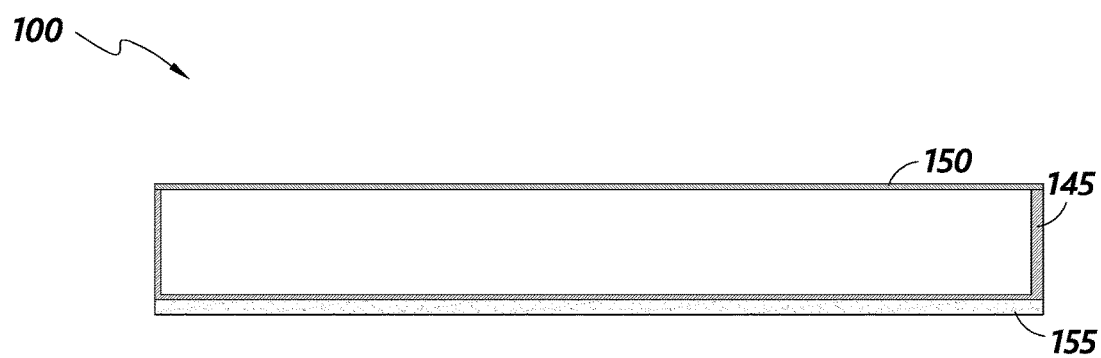

FIGS. 1A-1C illustrate a perspective exploded view and a simplified top down and side profile view of a tape embedded drive 100, according to certain embodiments. Focusing on FIG. 1B for example, the tape embedded drive comprises a casing 105, one or more tape reels 110, tape media 115, one or more motors (e.g., a stepping motor 120 (also known as a stepper motor), a voice coil motor 125, etc.), a head assembly 130 with one or more read and write heads, tape guides/rollers 135a, 135b and PCBA 155 (FIG. 1C). In an embodiment, most of the components are within an interior cavity of the casing, except the PCBA which is mounted on an external surface of the casing. The same components are illustrated in a perspective view in FIG. 1A.

In the illustrated embodiment, two tape reels 110 are placed in the interior cavity of the casing, with the center of the two tape reels on the same level in the cavity and with the head assembly 130 located in the middle and below of the two tape reels. Tape reel motors 140 located in the spindles of the tape reels can operate to wind and unwind the tape film in the tape reels. Each tape reel may also incorporate a tape folder to help the tape film be neatly wound onto the reel. The tape media may be made via a sputtering process to provide improved areal density.

Tape film from the tape reels are biased against the guides/rollers 135a, 135b and are movably passed along the head assembly 130 by movement of the reels. The illustrated embodiment shows four guides/rollers 135a, 135b, with the two guides/rollers 135a furthest away from the head assembly 130 serving to change the direction of the film and the two guides/rollers 135b closest to the head assembly 130 pressing the film against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or greater number of rollers could be used. For example, the two functional rollers may be cylindrical in shape, while the two functional guides may be flat-sided (e.g., rectangular prism) or clip shaped with two prongs and the film moving between the prongs of the clip.

The voice coil motor and stepping motor can variably position the tape head(s) transversely with respect to the width of the recording tape. The stepping motor can provide coarse movement while the voice coil motor can provide finer actuation of the head(s). In an embodiment, servo data can be written to the tape to aid in more accurate positioning of the head(s) along the tape film.

In addition, the casing 105 can comprise one or more particle filters 141 and/or desiccants 142 (FIG. 1A) to help maintain the environment in the casing. For example, if the casing is not airtight, the particle filters may be placed where airflow is expected. The particle filters and/or desiccants can be placed in one or more of the corners or any other convenient place away from the moving internal components. For example, the moving reels may generate internal airflow as the tape winds/unwinds, and the particle filters can be placed within that airflow.

There is a wide variety possible in the placement of the internal components of the tape embedded drive 100 within the casing. In particular, as the head mechanism is internal to the casing in certain embodiments, the film does not ever have to be exposed outside of the casing, such as in conventional tape drives. Thus, the tape film does not need to be routed along the edge of the casing and can be freely routed in more compact or otherwise more efficient ways within the casing. Similarly, the head(s) and tape reels can be placed in a variety of locations to achieve a more efficient layout, as there is no design requirement to provide external access to these components.

As shown in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside the casing for other components, particularly the moving components and film media that benefit from a more protected environment.

In some embodiments the tape embedded drive 100 is sealed. Sealing can mean the drive is hermetically sealed or simply enclosed without necessarily being airtight. Sealing the drive can be good for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen or some other typically inert gas.

In some embodiments, other components can be added to the tape embedded drive 100. For example, a pre-amp for the heads can be added to tape embedded drive. The pre-amp may be located on the PCBA 155, in the head assembly 130, or in another location. In general, placing the pre-amp closer to the heads can have a greater effect on the read and write signals in terms of signal-to-noise ratio (SNR). In other embodiments, some of the components could be removed. For example, the filters 141 or the desiccant 142 may be left out.

Figure 2:
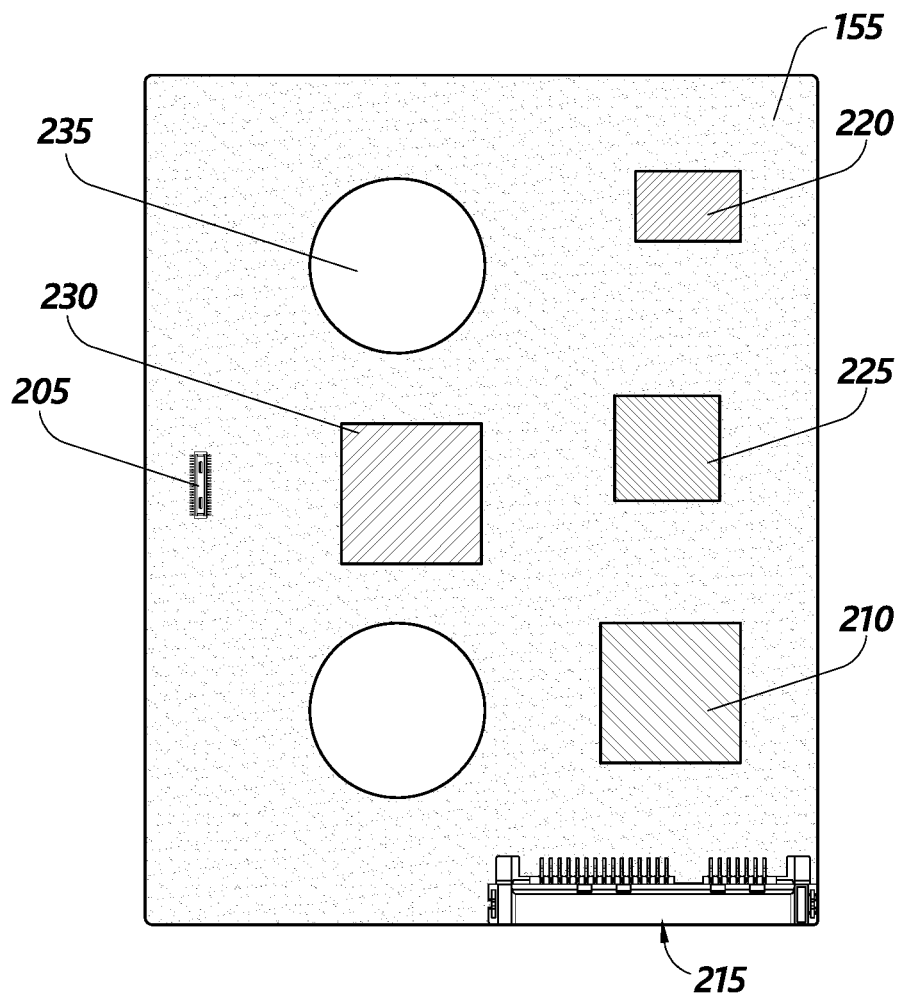
FIG. 2 illustrates a top perspective view of a Printed Circuit Board Assembly (PCBA) of the tape embedded drive, in accordance with some embodiments.

FIG. 2 illustrates a top perspective view of the PCBA 155 of the tape embedded drive 100, according to certain embodiments. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In an embodiment, the contacts/interface are built into the casing without compromising an air tight seal of the casing. In some embodiments, the connector 205 can be an electrical feed-through electrically connecting components inside the casing to those on the PCBA, while maintaining sealing of the casing. For example, an electrical feed-through similar to those found in sealed helium disk drives can be used, such as that described in U.S. Pat. No. 9,672,870, titled "Sealed bulkhead electrical feed-through X-Y positioning control," issued on Jun. 6, 2017 and assigned to the assignee of this disclosure, the disclosure of which is incorporated by reference.

The PCBA 155 can include various components, such as one or more controllers, one or more connectors 205, an SoC 210, one or more data interfaces 215 (e.g., Serial ATA (SATA), Serial Attached SCSI (SAS), non-volatile memory express (NVMe) or the like), memory 220, a Power Large Scale Integration (PLSI) 225, and/or data read channel controller 230. One or more cutouts 235 can be added in the PCBA to provide additional space for tape reel motors, if needed. For example, the portion of the casing above the tape reel motors 140 may be raised to provide additional space for the motors. By providing cutouts 235, the thickness of the tape embedded drive 100 can be reduced as the PCBA 155 can surround the raised portion of the casing.

The PCBA can extend along the entire bottom exterior surface of the casing 105 or may only partially extend along the surface, depending on how much space the various components need. In some embodiments, a second PCBA may be located internally in the casing 105 and be in communication with the first PCBA 155, for example, via the connector 205.

In some embodiments, a controller on the PCBA controls the read and write operations of the tape embedded drive 100. The controller can engage the tape spool motors and cause the tape spools to wind the tape film forward or backwards. The controller can use the stepping motor and the voice coil motor to control placement of the head(s) over the tape film. The controller can also control output/input of data to or from the tape embedded drive 100 through the one or more interfaces 215 such as SATA or SAS.

Figure 3A:
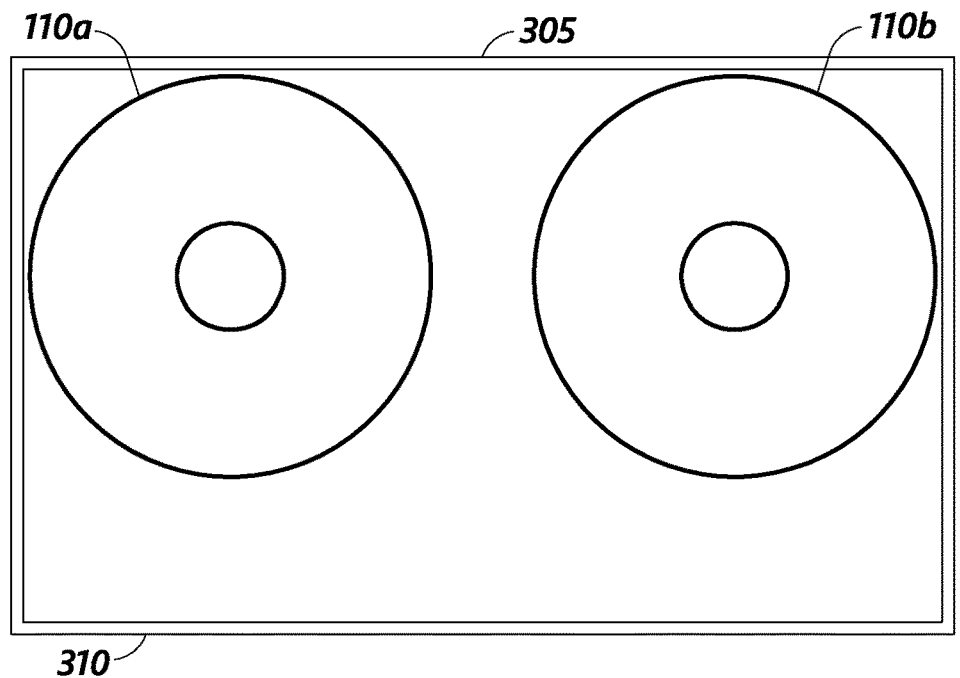
FIGS. 3A-3B illustrate possible placement locations of the tape reel(s) within the casing, in accordance with some embodiments.
Figure 3B:
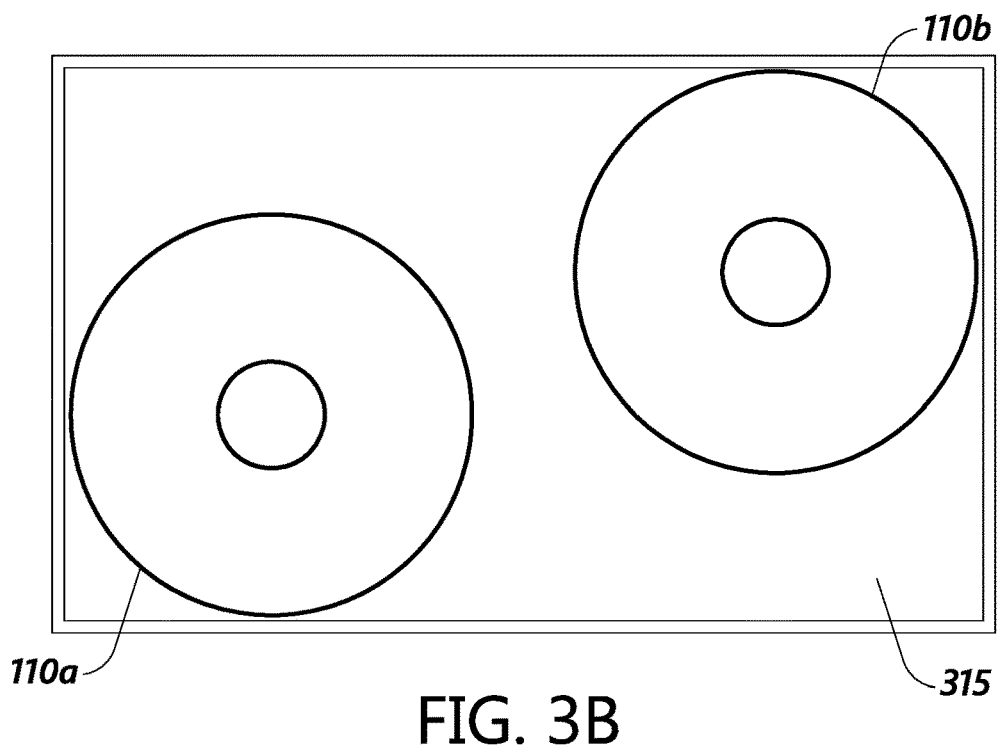

FIGS. 3A-3B illustrate possible placement locations of the tape reel(s) within the casing. As discussed above, the enclosed nature of the tape embedded drive 100 allows great leeway in placement of the internal components. FIG. 3A shows a placement of the tape reels 110a, 110b essentially along the same horizontal line. The reels are close to a top edge 305 of the casing, providing space along the bottom edge 310 of the casing for other internal components, such as motors and the head(s).

FIG. 3B shows a placement of the tape reels diagonally from each other. The right tape reel 110b is located on the top right corner of the casing, with the left tape reel 110a on the bottom left corner of the casing. Space along the bottom right corner 315 and/or the top left corner of the casing is left for other internal components, such as motors and the head(s). In another embodiment, the reels can be located in the top left corner and the bottom right corner, with space left over in the bottom left corner and/or top right corner.

Dimension Considerations

Figure 4:
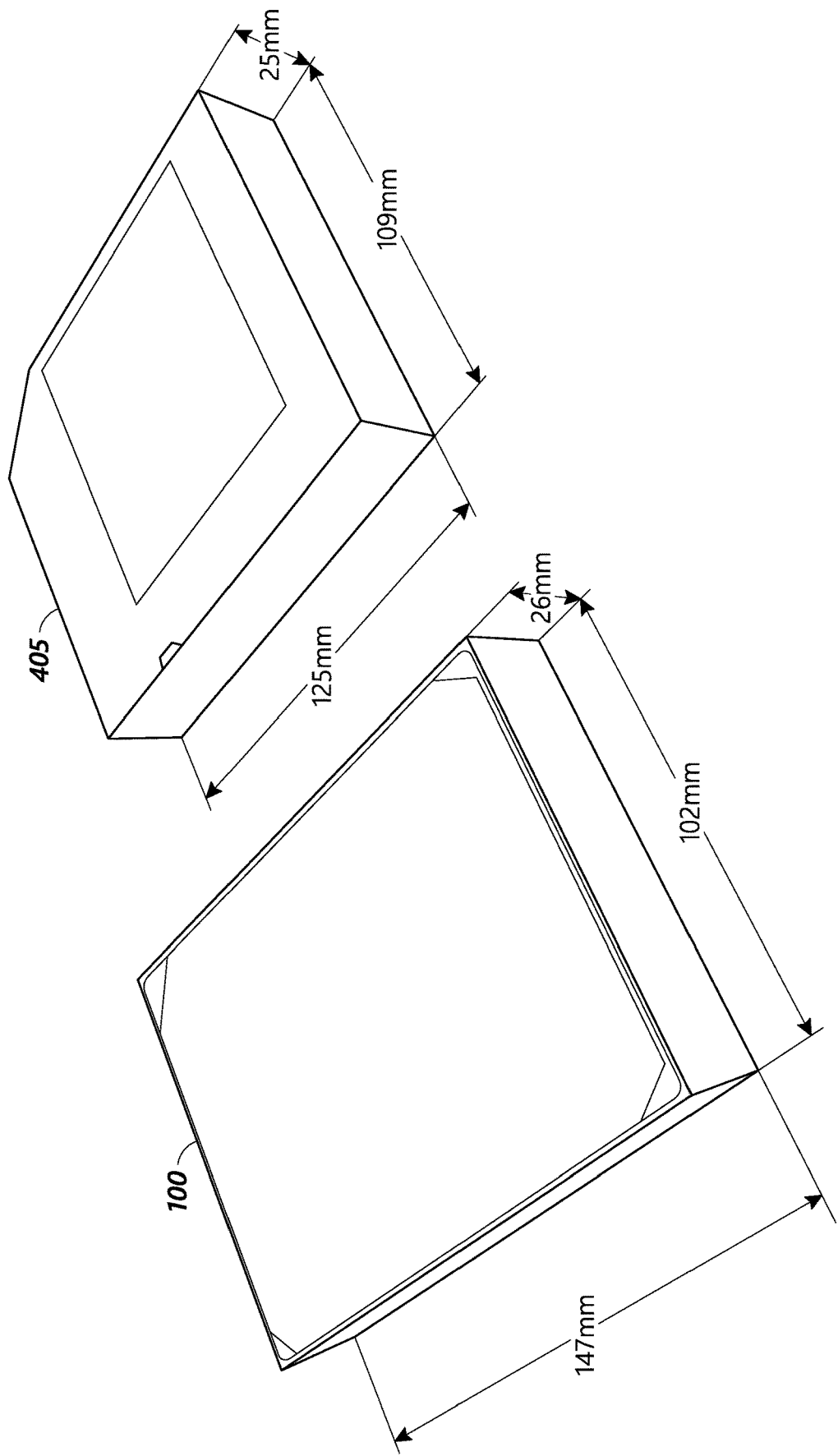
FIG. 4 illustrates a perspective view of a 3.5 inch form factor tape embedded drive and a Linear Tape-Open (LTO) tape cassette, in accordance with some embodiments.

FIG. 4 illustrates a perspective view of a 3.5 inch form factor tape embedded drive 100 and an LTO tape cassette, according to certain embodiments. In one embodiment, the tape embedded drive 100 has a length of 147 mm, a width of 102 mm and a height of 26 mm. An LTO cassette 405 has dimensions of a length of 125 mm, a width of 109 mm and a height of 25 mm. While the above discloses one set of possible dimensions for the tape embedded drive, other embodiments may have different dimensions. For example, the height might be doubled or otherwise increased (e.g., to about 52 mm) to allow larger tape film with a larger data capacity to be used.

The size (length×wide×height) of the tape embedded drive with PCBA can be optimized by access time and storage capacity. For faster access time, the tape film length should be shorter. Shorter tape film length can lead to shorter length and/or width size of the casing for the tape embedded drive, but at the potential cost of reduced total data capacity. For increased capacity, the casing can be lengthened in width and/or length to store longer total tape length, but at the potential cost of longer access time.

In some embodiments, the tape film width may be increased from the standard 12.65 mm used in LTO cassettes to a wider film. Increasing the tape width can increase capacity without necessarily having much effect on access time, as the overall tape length can stay the same.

Table 1 illustrates one possible embodiment for the tape film measurements of the tape embedded drive 100, in comparison to LTO tape measurements. Based on tape thickness, tape length can be calculated to be about 592 m, which is about 60% of the length of a standard LTO tape film. For reference, current LTO tape cassette (125 mm×109 mm×25 mm) has about 960 m of tape film length in the cassette (LTO-7 spec).

TABLE 1

|  | LTO-7 | Tape embedded drive |
| --- | --- | --- |
| Outer diameter (mm) | 91.9 | 68.0 |
| Inner diameter (mm) | 40.0 | 20.0 |
| Tape thickness (um) | 5.6 | 5.6 |
| Tape length (m) | 960 | 592 |

In an LTO cassette, with a 7 m/s tape wind up and a tape length of 1098 m, the average seek time is about 1098/3/7~=52 s, assuming that a ⅓ length seek time represents average seek time. Assuming an average robotics handling speed in the library system of 50 s, then total average data access time is about 100 s. On the other hand, some embodiments of the tape embedded drive, in a 3.5 inch form factor, can have an access time of 592/3/20~=10 s for average seek time. With a shorter tape length and hence smaller tape mass, 10 m/s, 15 m/s, and 20 m/s tape wind up could be achieved. Further, there may be no or at least less backlash due to inertial rotation from each tape reel motor.

While the above discusses the tape embedded drive 100 as having a casing with a 3.5 inch form factor like that of HDDs, the tape embedded drive 100 can use other form factors. For example, if tape technology becomes sufficiently miniaturized in the future, then the tape embedded drive could use a 2.5 inch drive form factor, like that used by laptop HDDs. In some embodiments where larger sizes are desired, the tape embedded drive 100 can use a 5.25 drive form factor for the casing, such as that used by computer CD-ROMs. Further, the tape embedded drive 100 can use the 3.5 inch form factor with some variations. For example, the drive may be slightly longer/shorter, slightly thicker/thinner, or the like. Even with slight differences in dimensions or placement of data/power interfaces, the drive 100 may still be compatible with existing 3.5 inch based infrastructure found in various computer equipment, such as racks and servers.

Head Assembly

Figure 5:
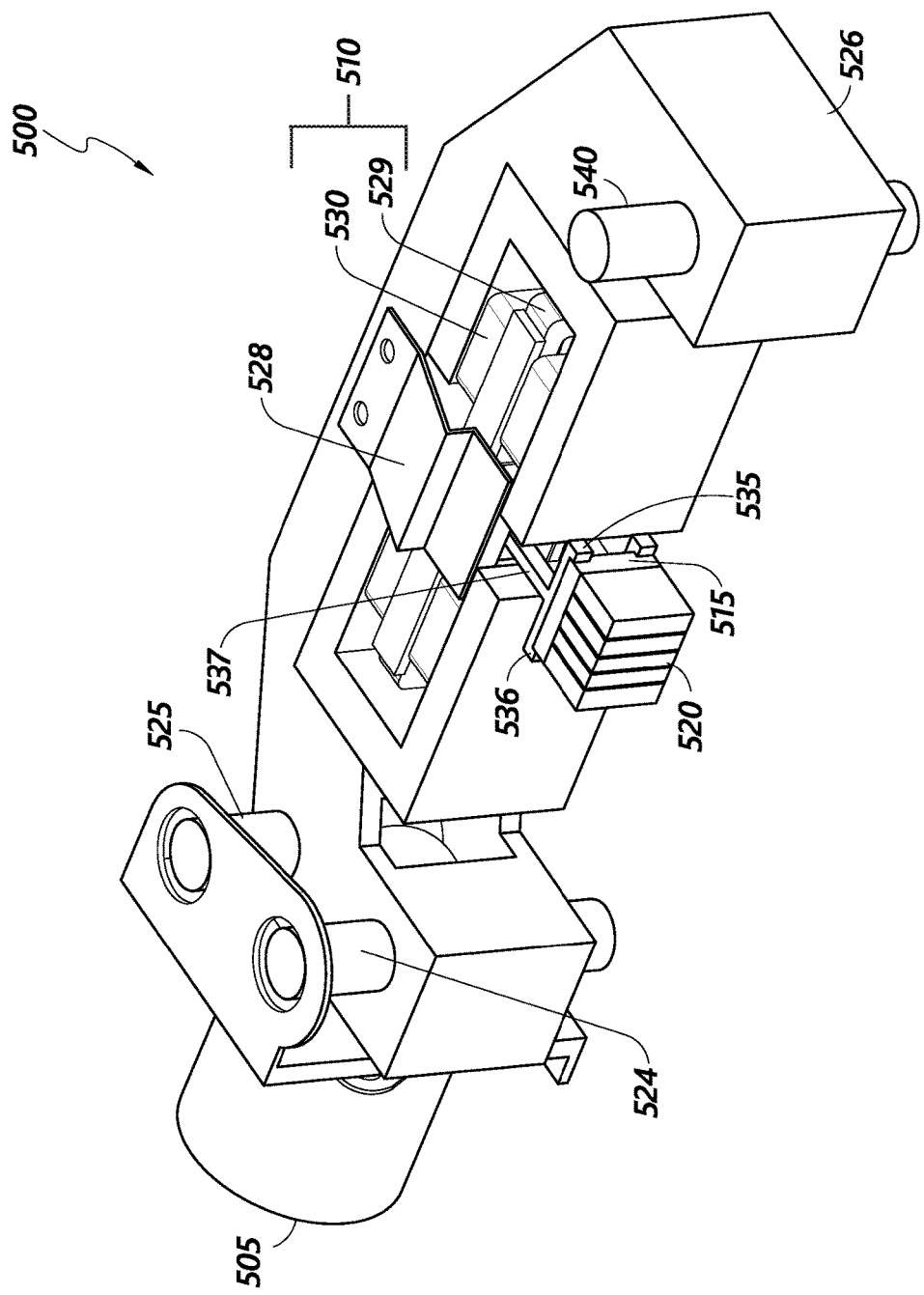
FIG. 5 illustrates a head assembly of the tape embedded drive, in accordance with some embodiments.

FIG. 5 illustrates a head assembly 500 of the tape embedded drive 100, according to certain embodiments. The head assembly 500 comprises a multi-stage actuator for moving the head assembly. In some embodiments, the multi-stage actuator comprises a stepping motor 505 (first stage), a voice coil motor 510 (second stage) comprising a coil 529 and magnet 530 and a piezoelectric actuator 515 (third stage) which can provide coarse, fine, and ultra-fine actuation, respectively, for up/down movement of a head bar 520. In an embodiment, the piezoelectric actuator is a lead zirconate titanate (PZT) actuator (e.g., shear PZT). By using a 3-stage motor, the movement of the head bar 520 can be more precise. With greater precision, more channels can be supported on the tape film, potentially allowing for greater data density on the tape film. In one embodiment, the head bar comprises heads in a write-read-write layout, similar in layout to conventional tape heads. In another embodiment, the head bar comprises two heads in a read-write layout, similar in layout to HDD heads.

The head assembly 500 can further comprise a screw shaft 525 connecting an actuator block 526 to the stepping motor. The screw shaft 525 and guide shafts 524, 540 can facilitate movement of the actuator block by the stepping motor 505. In some embodiments, a different number of guide shafts are used (e.g., 0, 1, 3+). For example, smaller or lighter actuator blocks may need less support during movement and use only one or even no guide shafts. Meanwhile, larger or heavier actuator blocks could use additional guide shafts or multiple screw shafts.

A suspension assembly 528 can connect the head bar 520 to the actuator block 526. In one embodiment, the suspension assembly includes a mounting plate, a load beam, and a laminated flexure to carry the electrical signals to and from the read and write heads in the head bar. The suspension assembly 528 can also include a coil 529 through which a controlled electrical current is passed. The coil 529 interacts with one or more magnets 530 attached to the actuator block 526 to form a voice coil motor 510 for controllably moving the head bar 520.

In an embodiment, a head support block 535 connects the head bar 520 and piezoelectric actuator 515 to the suspension assembly 528. The head support block 535 can comprise a clamp 536 to secure the head bar 520 and the piezoelectric actuator 515 and a supporting structure 537 perpendicular to the clamp to connect the base to the suspension assembly 528. In an embodiment, the head support block and the actuator form a suspension system that allows the head bar 520 to move across the width of the tape media, in conjunction with the control provided by the voice coil motor 510 and the stepping motor 505.

Note also that the piezoelectric actuator 515 may optionally be a multilayer piezoelectric element, comprising a plurality of piezoelectric material layers sandwiched between conductive (e.g., gold) electrode layers. The piezoelectric actuator 515 may optionally comprise one or more of the many known piezoelectric materials, for example, lead zirconate titanate, lead scandium tantalite, lanthanum gallium silicate, lithium tantalite, barium titanate, gallium phosphate and/or potassium sodium tartrate.

In one embodiment, the piezoelectric actuator 515 extends or contracts along a second axis. The actuator 515 can push the head bar 520 towards the tape media or pull the head(s) away from the tape media. In one embodiment, a heater (e.g., heating coil) may be incorporated into the head bar 520 in order to cause the head(s) to move closer to the tape film. A touchdown sensor could also be incorporated into the head bar to detect head-film contact and prevent the head bar from touching the tape film.

By allowing the head(s) to move closer to the tape film, the signal strength can be increased. In addition, by allowing the head bar to move away from the tape media, a fast-forward or fast-rewind function can be enabled for the tape embedded drive 100. As the head bar is further away from the media, the chances of the media hitting the head bar is decreased even if the tape media is moving faster. By avoiding contact, the reliability of the read and write heads and/or the tape media are maintained.

In order to better secure the head assembly 500 to the casing 105, a second guide shaft 540 may be used. In one embodiment, the first guide shaft 524 is on one side of the actuator block 526 with the second guide shaft 540 on the opposite end of the actuator block 526.

In one implementation, movement of the head bar 520 is accomplished in a 3-stage action. First, the stepping motor makes the screw shaft 525 rotate, causing the actuator block to move up and down the first guide shaft 524 and the second guide shaft 540. This causes the head bar to move across (up and down) the width of a tape film. When current is applied to the VCM coil, the head support block also goes up and down, while being supported by the suspension assembly. When voltage is applied to the piezoelectric actuator 515, the head(s) again move up and down. Working in tandem, the 3-stage action can move the head bar across (up and down) the width of the tape film in coarse, fine or very fine increments. In one embodiment, the 3 stages of movement proceed at around a 30,000/10,000/1 ratio, with the stepping motor 505 capable of moving up to 12.65 mm, the VCM 510 capable of moving up to 4 mm and the piezoelectric actuator 515 capable of moving up to 0.4 μm.

Figure 6:
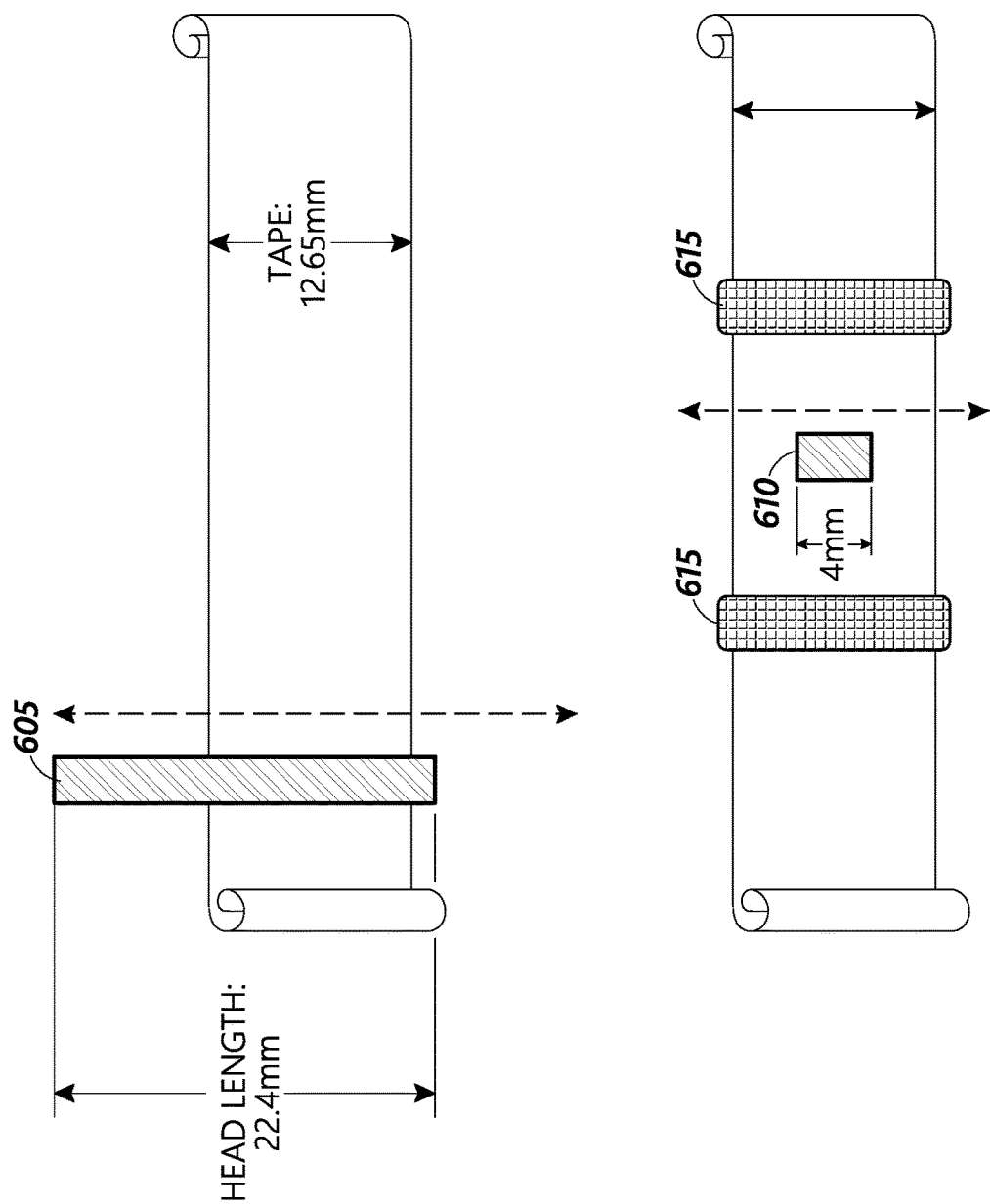
FIG. 6 illustrates an LTO head bar and a head bar for the tape embedded drive, in accordance with some embodiments.

FIG. 6 illustrates an LTO head bar 605 and a head bar 610 for the tape embedded drive 100, according to certain embodiments. LTO cassettes only have a stepping motor and a voice coil motor to actuate the head bar. FIG. 6 shows the relationship between tape width and tape head bar length for LTO and for an embodiment of the tape embedded drive.

Multiple writers and readers can be located in a head bar. For example, a tape bar could have 1-10 reader heads and/or 1-10 writer heads. Typically, a tape head bar uses a writer-reader-writer layout. However, other layouts, such as writer-reader-reader-writer could be used. In some embodiments, using two or more readers provides better signal-to-noise ratio (SNR), allowing for higher TPI.

Tape recording uses head film contact technology for recording. Typically, an LTO tape uses four data bands on the film, in which the head(s) are moved to four different locations up and down the width of the tape. The stepping motor is used to move to each of the four locations, with the voice coil motor handling finer actuation within each location. Thus, an LTO cassette uses a longer head bar length (e.g. 22.4 mm) than the tape width (12.65 mm) so that the tape width is covered by the head bar in each of the four locations it may move to.

Due to the heavy mass of the longer head bar 605, wider head reader width and limited movement granularity of the stepping and voice coil motors, the track density on the film for an LTO cassette is limited. An LTO-7 track pitch is 10.7k TPI (2.37 μm).

In one embodiment, the tape embedded drive 100 comprises a significantly smaller head bar 610 than an LTO head bar 605, such as a head bar 610 of about 4 mm in length. With a shorter head bar length and corresponding less mass, the head bar can be moved up and down by PZT ultra-fine actuation. In an embodiment, the head assembly is attached to the PZT actuator (as discussed in FIG. 5), which is located on an assembly attached to an actuatable portion of the voice coil motor, which in turn is on an assembly attached to an actuatable portion of the stepping motor. In one embodiment, the PZT actuator is moved by the voice coil motor and the voice coil motor is in turn moved by the stepping motor.

While the above discusses head bar sizes of about 4 mm, other sizes are possible, such as about 3 mm, about 5 mm or even other sizes. In some embodiments, the head bar is significantly smaller than the tape width. For example, the head bar may be less than half or even less than a quarter of the width of the tape media.

In one embodiment, two tape guides 615 are located on both sides of the tape assembly. The tape guides limit the movement of the tape and provide better stability when the head assembly is moving over the tape film. In other embodiments, only a single tape guide placed either before or after the head assembly may be utilized.

The head bar 610 can be supported by an HDD-like gimbal assembly or suspension assembly (as discussed in FIG. 5). This can provide gentler and/or more stable head to film contact, potentially providing better reliability for reading and/or writing. The suspension assembly could use a variety of materials, such as stainless steel or the like.

Head Assembly Embodiments

FIGS. 7-10C illustrate various different embodiments of the head assembly of the tape embedded drive 100. These are just some variations; other variations could work with the tape embedded drive 100. For example, the following examples use piezoelectric actuators, such as shear or push-pull PZTs. However, other types of actuators with similar performance characteristics could be used. In another example, different numbers of piezoelectric actuators (e.g., 1, 2, 3, 4, etc.) could be used instead of the numbers shown.

Figure 7B:
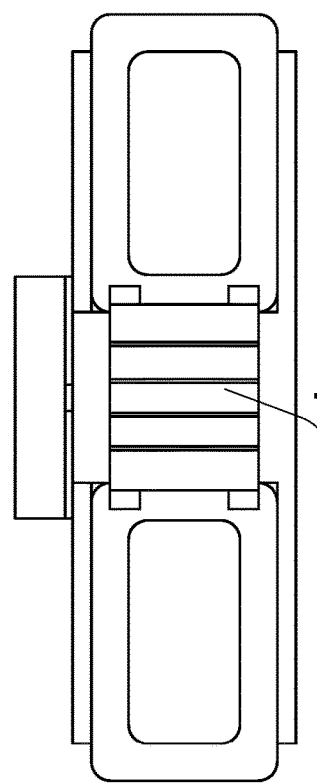
FIGS. 7A-7B illustrate perspective and facing views of another head assembly, in accordance with some embodiments.
Figure 7A:
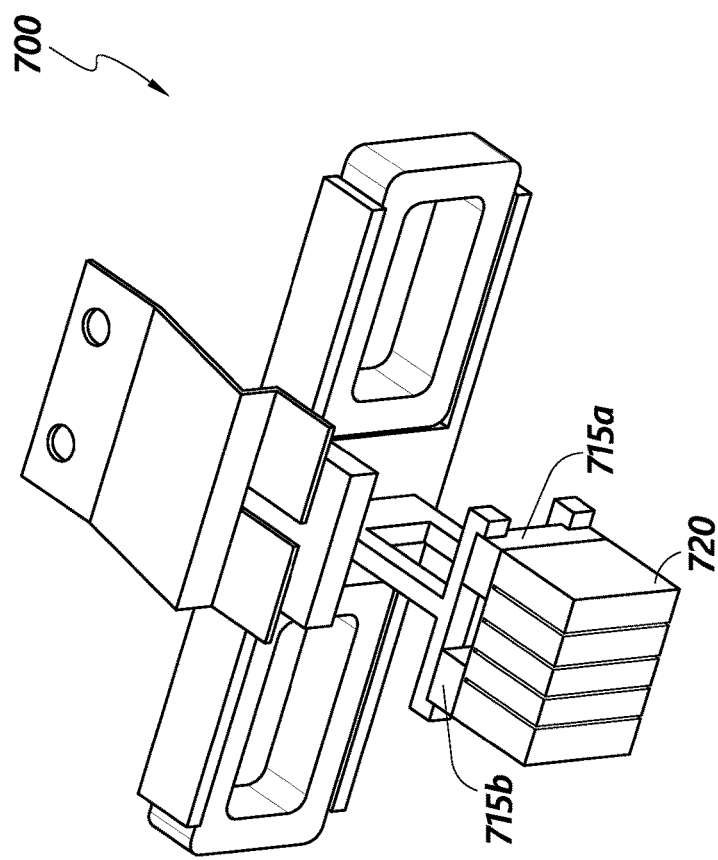

FIGS. 7A-7B illustrate perspective and facing views of an embodiment of the head assembly 700. While the head assembly 700 is similar to the head assembly of FIG. 5, the piezoelectric actuator is split into two bars or sections 715a, 715b, with a cutout in the middle. The piezoelectric actuators move the head bar 720 across the width of the tape media, as shown by the dashed arrows in FIG. 7B. Reducing the amount of piezoelectric material can reduce weight, which is beneficial to movement of the head bar 720. For example, a lighter head bar can reduce the electrical power needed to actuate the head bar. Reducing the material can also reduce production costs.

Figure 8B:
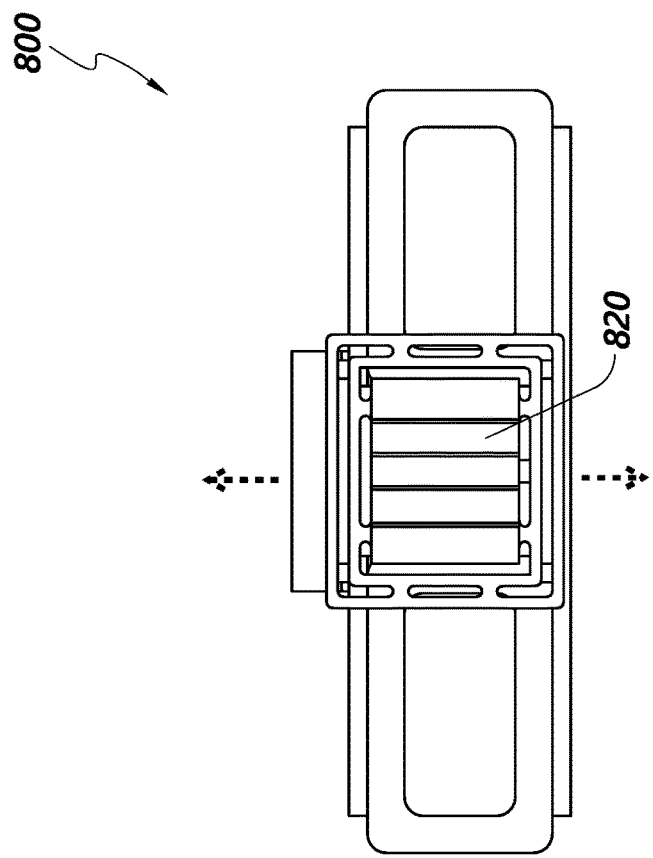
FIGS. 8A-8B illustrate perspective and facing views of a head assembly using a suspension system, in accordance with some embodiments.
Figure 8A:
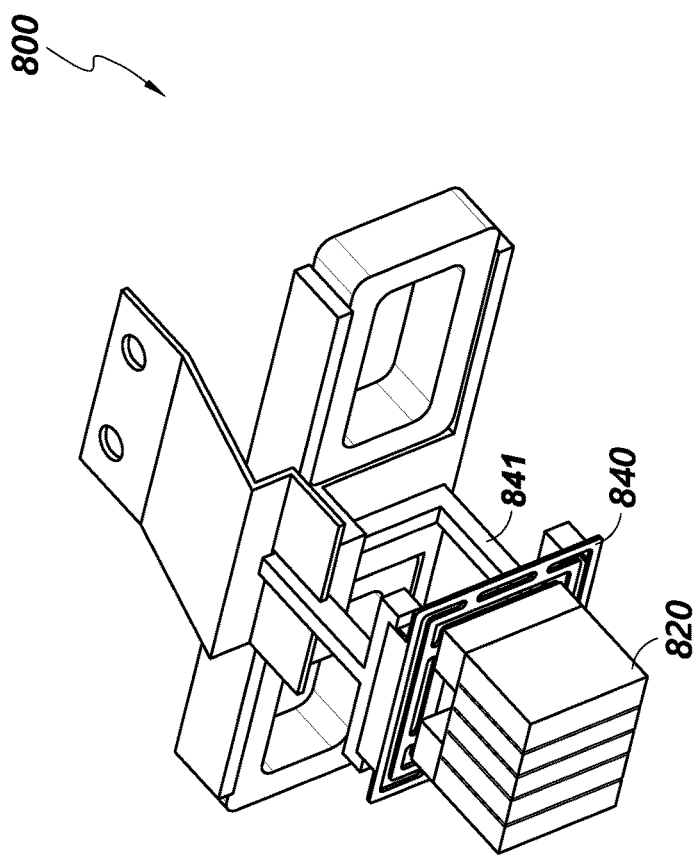

FIGS. 8A-8B illustrate perspective and facing views of another embodiment of the head assembly 800 using a suspension system 840. The head assembly 800 is similar to the head assembly of FIGS. 7A-7B, with the addition of the suspension system 840. The suspension system 840 can aid the head bar 820 in maintaining soft-touch contact with the tape film. As the tape film moves past the head bar 820, the tape may fluctuate slightly with respect to the touching head surface. The suspension system 840 can compensate for those fluctuations and enable the head to remain in contact with the tape film. This can increase read/write performance, reduce potential damage to the tape film, and/or enhance read/write reliability.

In one embodiment, the suspension system 840 comprises a frame. The frame can be connected to a support structure 841 like the head support block described in FIG. 5 on one side. The head bar 820 can be connected to the other side of the frame.

In some embodiments, the cutouts in the suspension system 840 can be enlarged or decreased in order to change the tension of the suspension system 840. Changing the tension can affect the amount of movement of the head bar 820 when the piezoelectric actuators move the head bar across the tape media, as shown by the dashed arrows in FIG. 8B.

Figure 9B:
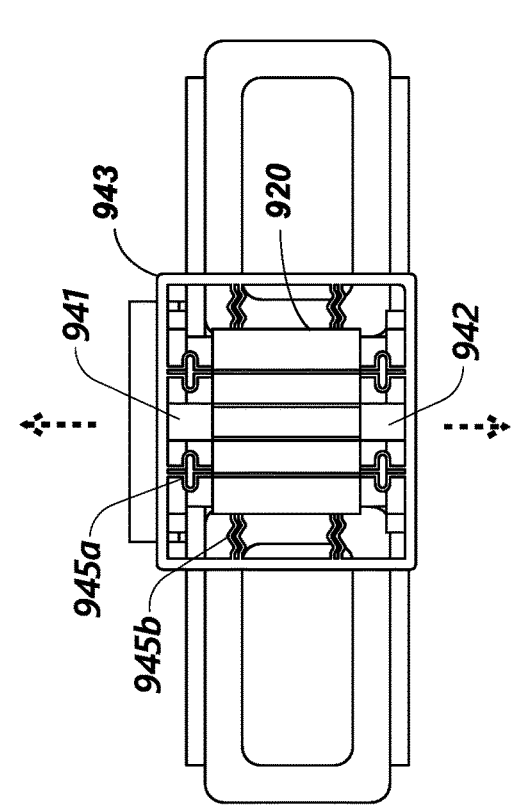
FIGS. 9A-9B illustrate perspective and facing views of a head assembly using a push-pull suspension system, in accordance with some embodiments.
Figure 9A:
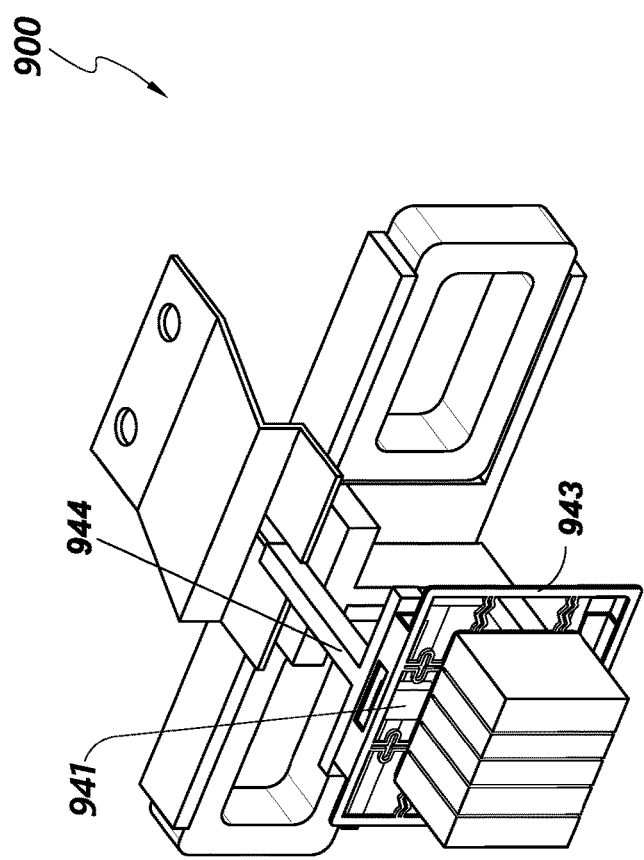

FIGS. 9A-9B illustrate perspective and facing views of another embodiment of the head assembly 900 using a push-pull suspension system. Push-pull actuators generally use less voltage than shear actuators. The push-pull suspension system comprises a push actuator 941, a pull actuator 942 and a frame 943. In one embodiment, the push actuator, the pull actuator, and a plurality of suspension wires connect the head bar 920 to the frame 943 connected to a support structure 944.

Working in tandem, the push and pull actuators can move the suspended head up and down relative to the width of the tape, as shown by the dashed arrows in FIG. 9B. For example, when the push actuator 941 contracts, the pull actuator 942 expands, thereby pushing the head to one direction (up). When the push actuator 941 expands and the pull actuator 942 contracts, the head is pushed in the opposite direction (down). In an embodiment, the push and pull actuators are PZTs.

The suspension system can also comprise wire suspensions 945a, 945b for movably supporting the head(s). In an embodiment, the wire suspensions 945a, 945b are made of a flexible material that can be easily moved by the push and pull actuators. In the illustrated embodiment, two suspension wires are placed on each side of the head(s).

The design of the wire suspensions may be different to account for the desired movement of the head bar. For example, the push pull actuators 941, 942 are moving the head bar across the width of the tape media, as shown by the dashed arrows. In one embodiment, a first suspension wire type 945a is configured to facilitate the up-down movement, for example, by having a loop section configured to compress along the up-down movement. In one embodiment, a second suspension wire type 945b is configured to reduce lateral movement during the up-down movement. For example, the second suspension wire may be stiffer, utilize a higher tensile material, and/or utilize a shape (e.g., a "W" shape) that reduces compression along the direction perpendicular to the up-down motion.

Push-pull actuators designs used in HDDs can be adapted for use in tape drives, as described above. Push-pull designs have high reliability and low production cost, making them a good fit for embodiments of the tape embedded drive 100.

Figure 10B:
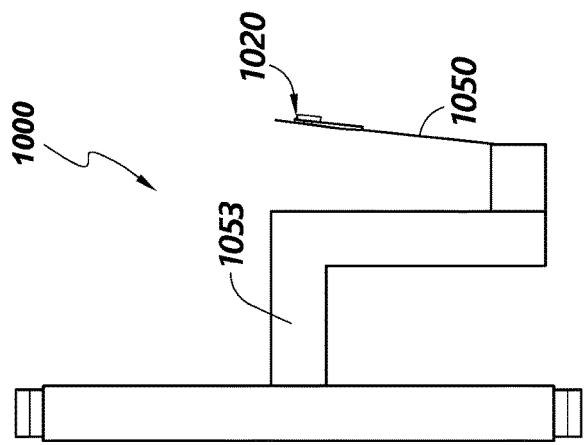
FIGS. 10A-10C illustrate a perspective view, a first side profile view, and a second side profile view of another embodiment of the head assembly comprising a head gimbal assembly, in accordance with some embodiments.
Figure 10C:
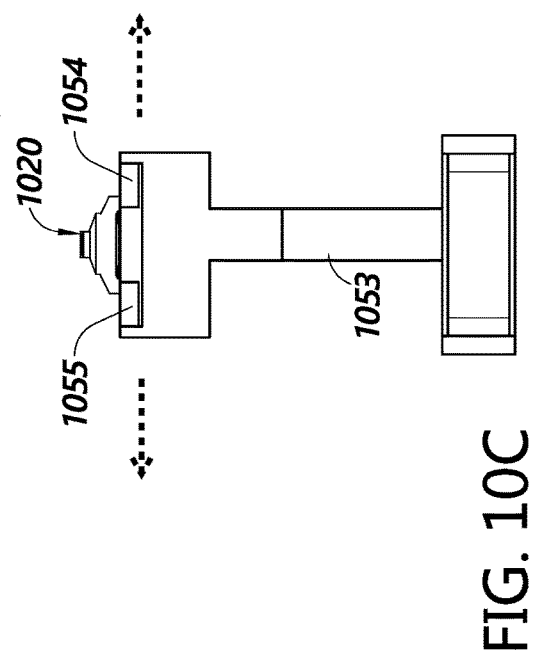
Figure 10A:
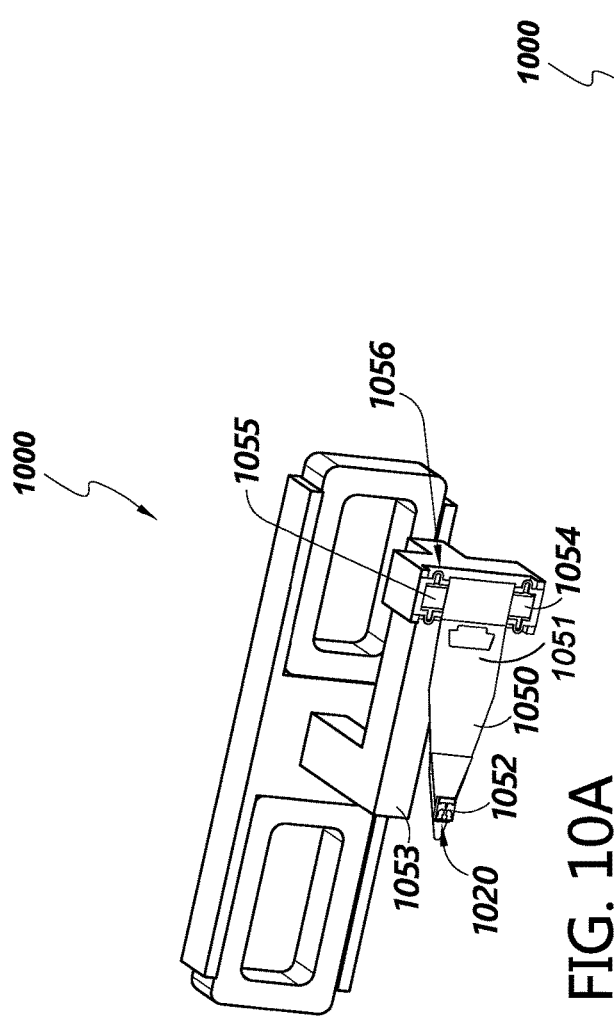

FIGS. 10A-10C illustrate a perspective view (FIG. 10A), a first side profile view (FIG. 10B) and a second side profile view (FIG. 10C) of another embodiment of the head assembly 1000 comprising a head gimbal assembly (HGA) 1050 adapted from HDD HGAs. FIG. 10C is a side profile view of FIG. 10B rotated 90 degrees along an axis. The HGA 1050 comprises an elongated suspension 1051 comprising a top end and a base end. The suspension 1051 can support, on its top end, a head 1020 (or multiple ones) and head slider (or multiple ones) with an air bearing system 1052.

The elongated suspension 1051 can be connected, at its base end, to a supporting structure 1053 by one or more actuators 1054, 1055 and a spring-type clamp 1056. In the illustrated embodiment, the one or more actuators are a push-pull actuator, with a first actuator 1054 and a second actuator 1055 connecting the base of the suspension 1051 to the spring-type clamp 1056 that connects the suspension 1051 to the supporting structure 1053.

In an embodiment, the first actuator 1054 and the second actuator 1055 are PZT actuators. As shown in FIG. 10C, when the first actuator 1054 expands and the second actuator 1055 contracts, the head(s) move to the left. When the first actuator 1054 contracts and the second actuator 1055 expands, the head(s) move to the right.

Control System

Figure 11:
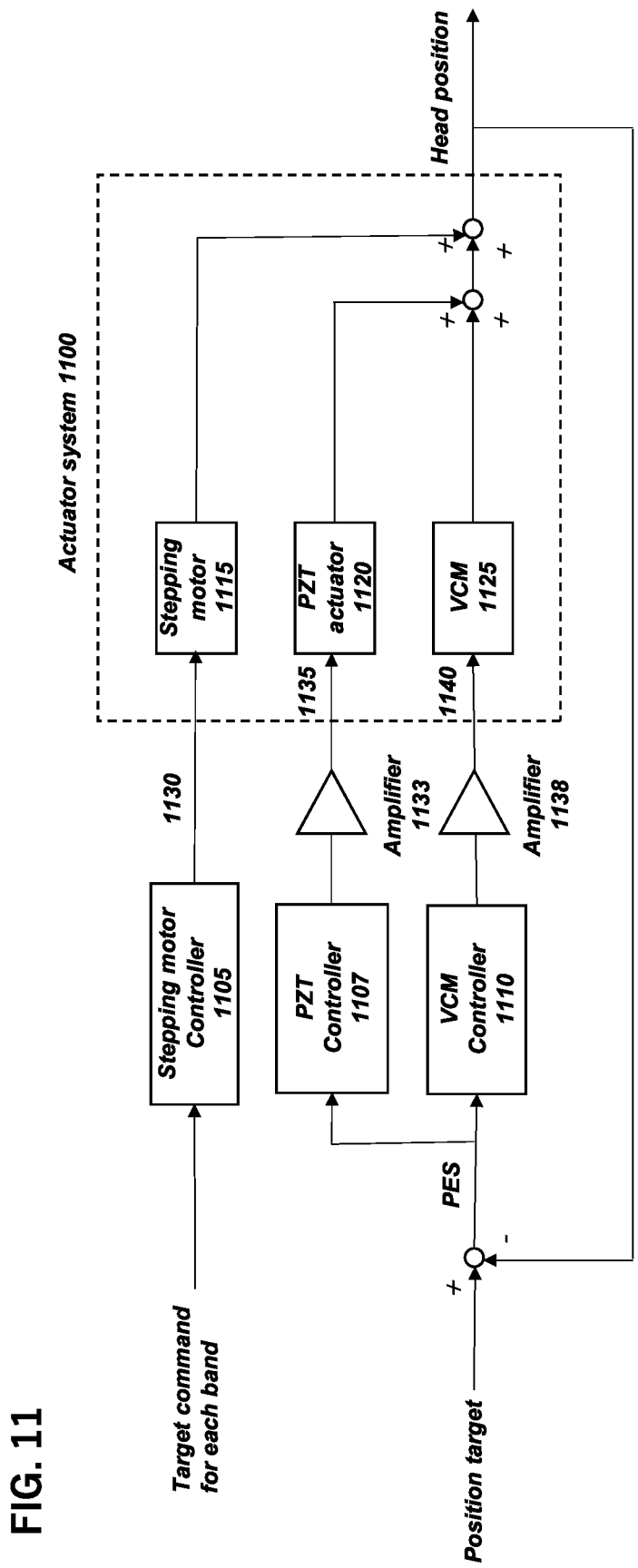
FIG. 11 illustrates a control block diagram for a servo-mechanical system of the tape embedded drive, in accordance with some embodiments.

FIG. 11 illustrates a control block diagram for a servo-mechanical system 1100 of the tape embedded drive 100, according to certain embodiments. The control logic for the system may be implemented as a process in one or more controllers of the tape embedded drive 100, such as the SoC and/or PLSI in the PCBA and used to control one or more motors and/or actuators.

In an embodiment, a stepping motor controller 1105, a PZT controller 1107 and a VCM controller 1110 work together to control a stepping motor 1115, a PZT actuator 1120, and a VCM 1125 to coordinate the movement of the head(s) in response to a target command.

As discussed above, the stepping motor 1115 can provide coarse movement, the VCM 1125 can provide fine movement, and the PZT actuator 1120 can provide very fine movement. For example, assuming a 12.65 mm tape width, the stepping motor stroke may be about 12.65 mm, with the VCM stroke at about 4 mm, and the PZT stroke at about 0.4 µm. In this embodiment, that creates a movement ratio of about 30,000:10,000:1 (stepping motor/VCM/PZT actuator). In other embodiments, the ratios could be different based on the performance specification of the motors and actuators.

A first control signal 1130 is sent from the stepping motor controller to the stepping motor. The head(s) are then moved in a coarse movement. In an embodiment, a head position sensor detects the heads' position after the first movement and provides a positive error signal (PES) to the VCM and PZT controllers. In response, the VCM and PZT controllers can further move the head(s) in a fine and a very fine movement respectively, if needed, to place the head(s) into the desired position.

A first amplifier 1133 can be positioned in between the PZT controller 1107 and the PZT actuator 1120 to amplify a second control signal 1135. A second amplifier 1138 can be positioned in between the VCM controller 1110 and the VCM 1125 to amplify a third control signal 1140.

In an embodiment, the PZT actuator 1120 and VCM 1125 move the head(s) serially. The VCM first moves the head(s) and then, if the head(s) are within a first threshold distance from the target position, the PZT actuator 1120 can take over movement of the head(s) for very fine movements. In another embodiment, the PZT actuator 1120 and the VCM 1125 may move the head(s) in parallel. It should be noted that although PZT is used throughout in the description of the control system of FIG. 11, as disclosed above other types of actuators may be used in place of PZTs, and the system of FIG. 11 can be adapted accordingly in other embodiments.

Additional Embodiments

Those skilled in the art will appreciate that in some embodiments, other types of tape embed drive systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A head assembly for reading or writing to tape media in a tape drive, the head assembly comprising:
   a support structure;
   a head bar comprising at least one read head and at least one write head, the head bar being less than half a width of the tape media; and
   a suspension system connecting the head bar to the support structure, the suspension system comprising:
     one or more piezoelectric actuators configured to move the head bar across the width of the tape media; and
     an elongated suspension comprising a base end and a top end, the top end attached to the head bar, the base end movably attached by the one or more piezoelectric actuators to the support structure.

2. The head assembly of claim 1, wherein the one or more piezoelectric actuators comprise:
   a first piezoelectric actuator attached to a first side of the base end of the elongated suspension, the first piezoelectric actuator configured to pull the elongated suspension in a first configuration and push in a second configuration; and a second piezoelectric actuator attached to a second side of the base end of the elongated suspension, the second piezoelectric actuator configured to push in the first configuration and pull in the second configuration.

3. The head assembly of claim 1, wherein the head bar comprises a writer-reader-writer layout of heads.

4. The head assembly of claim 1, wherein the head bar comprises a writer-reader-reader-writer layout of heads.

5. The head assembly of claim 1, further comprising:
a spring-type clamp connecting the support structure to the suspension system.

6. A storage device comprising the head assembly of claim 1.

7. A storage device comprising:
one or more tape reels comprising tape media for storing data;
a head assembly comprising:
a support structure;
a head bar comprising at least one read head and at least one write head; and
a suspension system connecting the head bar to the support structure, the suspension system comprising:
one or more piezoelectric actuators configured to move the head bar across a width of the tape media; and
an elongated suspension comprising a base end and a top end, the top end attached to the head bar, the base end movably attached by the one or more piezoelectric actuators to the support structure;
one or more motors configured to actuate the head assembly;
a sealed casing comprising an inner cavity, the inner cavity holding the one or more tape reels, the head assembly, and the one or more motors; and
a printed circuit board assembly (PCBA) mounted on an external surface of the casing, the PCBA electrically connected to the one or more motors and configured to control operations of the one or more motors.

8. The storage device of claim 7, wherein the PCBA comprises a Serial Attached SCSI (SAS) or a Serial ATA (SATA) connector.

9. The storage device of claim 7, wherein the casing is a 3.5 inch form factor.

10. The storage device of claim 7, wherein a width of the head bar is less than the width of the tape media.

11. The storage device of claim 7, wherein the one or more motors comprise:
a stepping motor configured to provide coarse movement of the head assembly; and
a voice coil motor configured to provide fine movement of the head assembly.

12. The storage device of claim 7, wherein the one or more piezoelectric actuators comprise:
a first piezoelectric actuator attached to a first side of the base end of the elongated suspension, the first piezoelectric actuator configured to pull the elongated suspension in a first configuration and push in a second configuration; and
a second piezoelectric actuator attached to a second side of the base end of the elongated suspension, the second piezoelectric actuator configured to push in the first configuration and pull in the second configuration.

13. The storage device of claim 7, the head assembly further comprising:
a spring-type clamp connecting the support structure to the suspension system.

14. The storage device of claim 7, wherein the head bar comprises a writer-reader-writer layout of heads.

15. The storage device of claim 7, wherein the head bar comprises a writer-reader-reader-writer layout of heads.

16. A storage device comprising:
one or more tape holding means configured to hold tape media for storing data;
a head assembly comprising:
a support structure;
a tape reading and writing means; and
a suspension means connecting the tape reading and writing means to the support structure, the suspension means comprising:
one or more actuating means configured to move the tape reading and writing means across a width of the tape media; and
an elongated suspension comprising a base end and a top end, the top end attached to the tape reading and writing means, the base end movably attached by the one or more actuating means to the support structure;
a head assembly actuating means;
a sealed casing comprising an inner cavity, the inner cavity holding the one or more tape holding means, the head assembly, and the one or more actuating means; and
a printed circuit board assembly (PCBA) mounted on an external surface of the casing, the PCBA electrically connected to the one or more actuating means and comprising components configured to control operations of the one or more actuating means.

17. The storage device of claim 16, wherein the one or more actuating means comprise:
a first actuating means attached to a first side of the base end of the elongated suspension, the first actuating means configured to pull the elongated suspension in a first configuration and push in a second configuration; and
a second actuating means attached to a second side of the base end of the elongated suspension, the second actuating means configured to push in the first configuration and pull in the second configuration.

18. The storage device of claim 16, wherein the PCBA comprises a Serial Attached SCSI (SAS) or a Serial ATA (SATA) connector.

19. The storage device of claim 16, wherein the casing is a 3.5 inch form factor.

20. The storage device of claim 16, wherein a width of the tape reading and writing means is less than the width of the tape media.

* * * * *